(12) United States Patent
Lee et al.

(10) Patent No.: US 7,629,035 B2
(45) Date of Patent: Dec. 8, 2009

(54) LIQUID CRYSTAL COMPOSITION AND LIQUID CRYSTAL DISPLAY DEVICE HAVING THE SAME

(75) Inventors: Jun-woo Lee, Anyang-si (KR); Sung-tae Shin, Seongnam-si (KR); E-joon Choi, Gumi-si (KR); Baek-kyun Jeon, Yongin-si (KR); Sung-woon Kim, Suwon-si (KR); In-suk Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 11 days.

(21) Appl. No.: 12/030,567

(22) Filed: Feb. 13, 2008

(65) Prior Publication Data
US 2008/0309864 A1 Dec. 18, 2008

(30) Foreign Application Priority Data
Jun. 14, 2007 (KR) .................. 10-2007-0058416

(51) Int. Cl.
*C09K 19/32* (2006.01)
*G02F 1/133* (2006.01)
(52) U.S. Cl. .................. 428/1.1; 252/299.62; 349/182
(58) Field of Classification Search ............ 252/299.01, 252/299.5, 299.62, 299.63, 299.67; 428/1.1; 349/182
See application file for complete search history.

(56) References Cited

U.S. PATENT DOCUMENTS
5,232,635 A * 8/1993 Van Moer et al. ............ 252/700

OTHER PUBLICATIONS

Zchang et al., "A blue electroluminescence organic material with liquid crystal property", Thin Solid Films 2007, 515(7-8), 3839-3897.*
CAPLUS 2007: 185085.*

* cited by examiner

*Primary Examiner*—Shean C Wu
(74) *Attorney, Agent, or Firm*—Cantor Colburn LLP (57) ABSTRACT

A liquid crystal composition includes a biaxial liquid crystal molecule and has improved response speed.

15 Claims, 6 Drawing Sheets

LIQUID CRYSTAL COMPOSITION AND LIQUID CRYSTAL DISPLAY DEVICE HAVING THE SAME

CROSS-REFERENCE TO RELATED APPLICATIONS

This application claims priority from Korean Patent Application No. 10-2007-0058416, filed on Jun. 14, 2007 in the Korean Intellectual Property Office, the entire contents of which are hereby incorporated by reference.

BACKGROUND OF INVENTION

1. Field of Invention

This disclosure relates to a liquid crystal composition and a liquid crystal display device comprising the same.

2. Description of Related Art

Currently, a liquid crystal display (LCD) device is used as a display for a mobile phone, a monitor, a television, and the like. The LCD device has improved properties with respect to viewing angle, color reproducibility, brightness, etc., but its response speed could do with some improvement.

Most of the currently used LCD devices use uniaxial liquid crystals. However, the uniaxial liquid crystals are relatively slow in response speed.

SUMMARY OF INVENTION

Disclosed herein is a liquid crystal composition having an improved response speed.

Disclosed herein too is an LCD device having a liquid crystal composition with an improved response speed.

Disclosed herein too is a liquid crystal composition comprising a liquid crystal molecule expressed by the following chemical formula 1:

Chemical formula 1 where n is 1 or 2, $X_1$, $X_2$, $X_3$, and $X_4$ independently represent one of —H, —F, —Br, —CN, —$NO_2$, and —$CF_3$, $Y_1$ and $Y_2$ are optional (i.e., they do not exist if so desired) and independently represent one of —OCO—, —COO—, —$CF_2$O—, and —$OCF_2$—, $Z_1$ and $Z_2$ independently represent a ring compounds, $T_1$ and $T_2$ independently represent —OR or —R, and R represents an alkyl group.

The ring compound may comprise

At least one of $X_1$, $X_2$, $X_3$, and $X_4$ may comprise one of —F, —Br, —CN, —$NO_2$, and —$CF_3$.

$X_1$ and $X_2$ may independently comprise one of —F, —Br, —CN, —$NO_2$, and —$CF_3$, when $X_3$ and $X_4$ comprise —H. $X_1$, $X_2$, $X_3$, and $X_4$ may thus be the same or different. R can be one of $C_4$ to $C_{18}$.

The liquid crystal composition may further comprise a monoaxial liquid crystal molecule with negative dielectric anisotropy.

The foregoing and/or other aspects can be achieved by providing a liquid crystal composition comprising a first ring compound having one of anthracene and pentacene, second and third ring compound that are combined with the first ring compound, the second and third ring compounds being covalently bonded the first ring compound so that the first, second and third ring compounds form a cross shape.

The foregoing and/or other aspects can be achieved by providing a liquid crystal display device, comprising: a first substrate; a second substrate facing the first substrate; and the liquid crystal composition disposed between the first and second substrates, the liquid crystal composition comprising a liquid crystal molecule expressed by the following chemical formula 1:

Chemical formula 1 where n is 1 or 2, $X_1$, $X_2$, $X_3$, and $X_4$ independently represent one of —H, —F, —Br, —CN, —$NO_2$, and —$CF_3$, $Y_1$ and $Y_2$ are optional (i.e., they need not exist in the Chemical formula 1) and independently represent one of —OCO—, —COO—, —$CF_2$O—, and —$OCF_2$—, $Z_1$ and $Z_2$ independently represent an aromatic ring compound, $T_1$ and $T_2$ independently represent —OR or —R, and R represents an alkyl group.

The aromatic ring compound may comprise

At least one of $X_1$, $X_2$, $X_3$, and $X_4$ may comprise one of —F, —Br, —CN, —NO$_2$, and —CF$_3$.

$X_1$ and $X_2$ may independently comprise one of —F, —Br, —CN, —NO$_2$, and —CF$_3$, when $X_3$ and $X_4$ comprise —H. $X_1$, $X_2$, $X_3$, and $X_4$ may be the same or different. R may comprise one of $C_4$ to $C_{18}$.

The liquid crystal display device may further comprise a monoaxial liquid crystal molecule with negative dielectric anisotropy.

The first substrate may comprise a first electrode and a second electrode that can be used to apply an electric field to the liquid crystal composition.

The first electrode and the second electrode may comprise faces that face each other in the longitudinal direction.

The first substrate may comprise a first electrode formed with a first electrode cutting pattern, and the second substrate comprises a second electrode formed with a second electrode cutting pattern. The width between the first electrode cutting pattern and the second electrode cutting pattern can be used to determine the responsiveness of the liquid crystalline composition.

BRIEF DESCRIPTION OF DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS OF INVENTION

Reference will now be made in detail to the embodiments of the present invention, examples of which are illustrated in the accompanying drawings, wherein like reference numerals refer to like elements throughout. The embodiments are described below so as to explain the present invention by referring to the figures.

In the following description, if a layer is said to be formed 'on' another layer, then a third layer may be disposed between the two layers or the two layers may be in contact with each other. In other words, it will be understood that when an element such as a layer, film, region, or substrate is referred to as being "on" another element, it can be directly on the other element or intervening elements may also be present.

Figure 1:
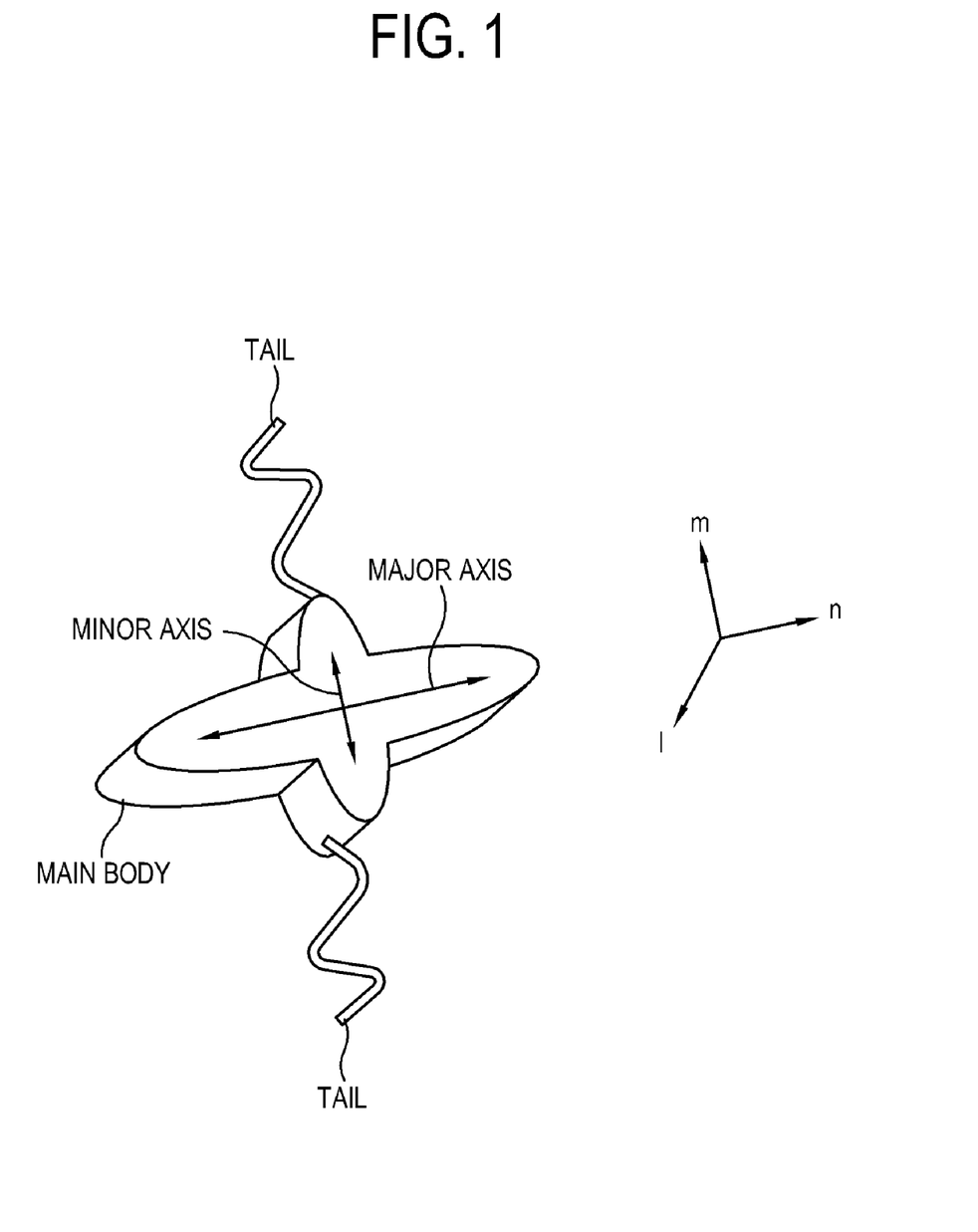
FIG. 1 illustrates a type of biaxial liquid crystal in a liquid crystal composition according to a first exemplary embodiment of the present invention.
Figure 2:
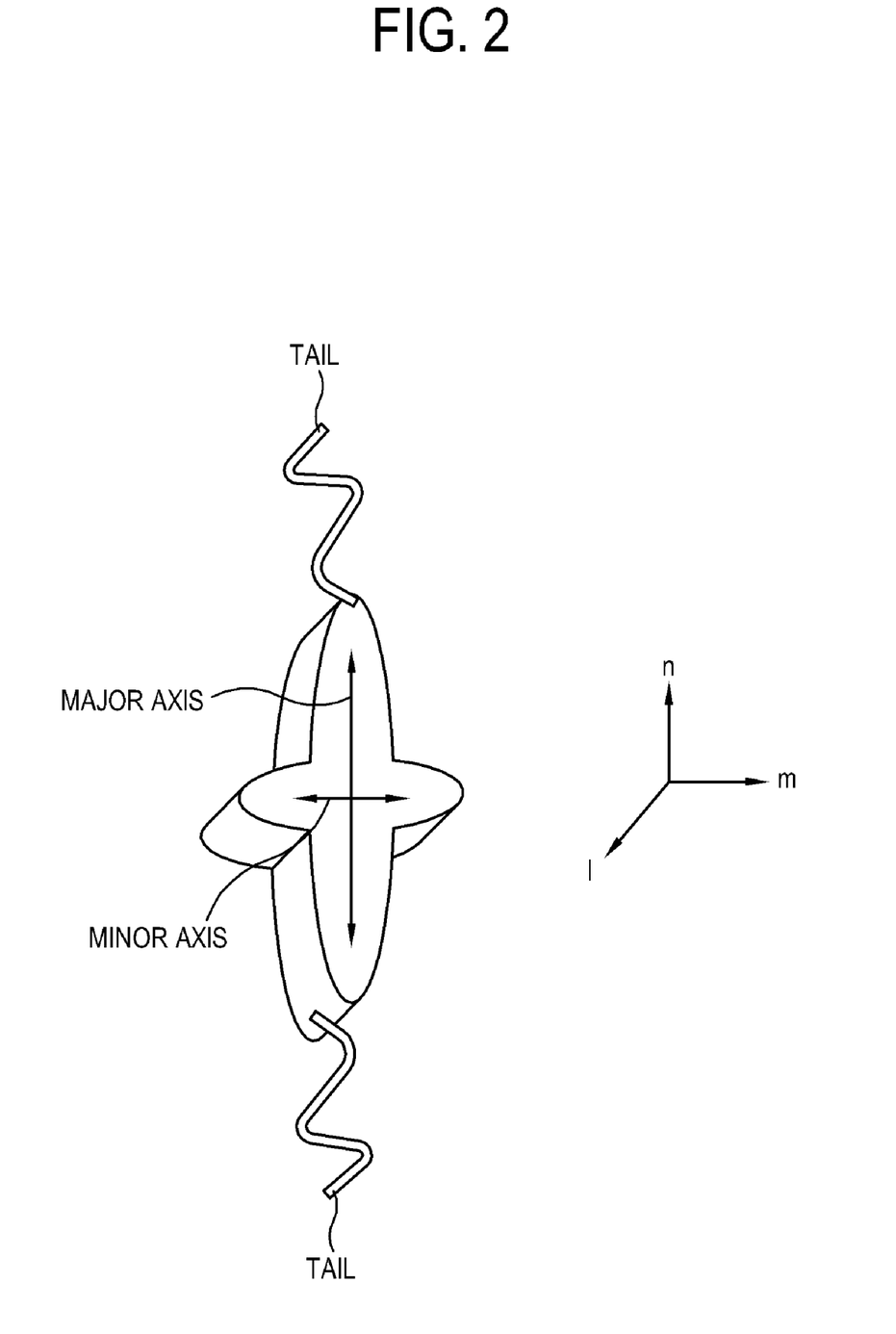
FIG. 2 illustrates another type of biaxial liquid crystal in the liquid crystal composition according to the first exemplary embodiment of the present invention.

FIGS. 1 and 2 illustrate one type of biaxial liquid crystal molecule used for a liquid crystal composition disclosed herein.

A liquid crystal composition may further include monoaxial liquid crystal molecules with negative dielectric anisotropy in addition to the biaxial liquid crystal molecules or other known additives as may be desirable. The additives include dyes, a UV stabilizing agent, and/or an antioxidant.

Referring to FIGS. 1 and 2, the biaxial liquid crystal molecules are substantially cross-shaped. The biaxial liquid crystal molecules are divided into a main body and a tail part. The main body has a cross shape which has a relatively long major axis and a relatively short minor axis. The major axis and the minor axis are perpendicular to each other. The tail part allows the liquid crystal molecules to be properly spaced apart from each other.

An optical axis of the biaxial liquid crystal molecules in FIG. 1 includes a first optical axis (axis n), a second optical axis (axis m), and a third optical axis (axis l). The first optical axis is parallel with the major axis of the main body of the liquid crystal molecules, and the second optical axis is parallel with the minor axis thereof and perpendicular to the first optical axis. The third optical axis refers to the thickness direction of the main body of the liquid crystal molecules. The tail part is connected to each of opposite ends of the minor axis.

An optical axis of the biaxial liquid crystal molecules in FIG. 2 also includes a first optical axis, a second optical axis, and a third optical axis. The first optical axis is parallel with the major axis of the main body of the liquid crystal molecules, and the second optical axis is parallel with the minor axis thereof and perpendicular to the first optical axis. The third optical axis refers to the thickness direction of the main body of the liquid crystal molecules. The tail part is connected to each of opposite ends of the major axis.

As described above, the biaxial liquid crystal molecules shown in FIGS. 1 and 2 have three optical axes (axis n, axis m, and axis l), which are perpendicular to each other. The refractive indices along each of the optical axes are different on each of the three optical axes.

In an electric field, the biaxial liquid crystal molecules have the first optical axis acting as a reference and the second optical axis and the third optical axis rotating, or the second optical axis acting as a reference and the first optical axis and the third optical axis rotating.

In other words, one of the first and second optical axes serves as a driving axis, and the other serves as a control axis to control movements of the liquid crystal molecules. The control axis enables the liquid crystal molecules to easily determine their moving direction, thereby enhancing their response speed. The biaxial liquid crystal molecules have a fast response speed, that is less than or equal to about 2 millisecond (ms) and specifically less than or equal to about 1 ms. Further, the biaxial liquid crystal molecules have their own multi-domain effect, which improves visibility.

The aforementioned biaxial liquid crystal molecules are expressed as the following chemical formula 1.

[Chemical formula 1]

where $X_1$, $X_2$, $X_3$, and $X_4$ each represent one of —H, —F, —Br, —CN, —NO$_2$, and —CF$_3$, but not limited thereto. $X_1$, $X_2$, $X_3$, and $X_4$ are a functional group with high electronegativity, which attracts electrons towards themselves, causing a nonuniform distribution of electrons of the liquid crystal molecules.

For a nonuniform distribution of electrons, it is desirable that at least one of $X_1$, $X_2$, $X_3$, and $X_4$ is not a hydrogen (H). Further, it is even desirable that $X_1$ and $X_2$ each are one of —F, —Br, —CN, —NO$_2$, and —CF$_3$, when $X_3$ and $X_4$ are provided as —H.

Meanwhile, it is suitable that $X_1$, $X_2$, $X_3$, and $X_4$ are the same for a simple compounding process of liquid crystal molecules.

$Y_1$ and $Y_2$ are a linking group and represent one of —OCO—, —COO—, —CF$_2$O—, and —OCF$_2$—, but not limited thereto. Either or both of $Y_1$ and $Y_2$ may not be provided.

$Z_1$ and $Z_2$ are ring compounds respectively and represent one of

, or

-continued

.

$Z_1$ and $Z_2$ impart a liquid crystal property to the liquid crystal molecules.

Depending on the size of the ring compound, the first and second optical axes of the liquid crystal molecules may be changed. For example, given n=1 with $Z_1$ and $Z_2$ being

, an axis passing through the tail ($T_1$ and $T_2$) is defined as a first optical axis. Given n=2 with $Z_1$ and $Z_2$ being

, an axis passing through the tail ($T_1$ and $T_2$) is defined as a second optical axis.

$T_1$ and $T_2$ serve as flexible spacers to space liquid crystals apart from each other and are provided as —R or —OR, but not limited thereto. R represents one of C4 to C18 alkyl groups.

In the foregoing chemical formula 1, in the case where n is 1, i.e., the liquid crystal molecules include anthracene, the liquid crystal molecules are expressed as the following chemical formula 1-1. In the case where n is given 2, i.e., the liquid crystal molecules include pentacene, the liquid crystal molecules are expressed as the following chemical formula 1-2.

[Chemical formula 1-1]

[Chemical formula 1-2]

One of the first and second optical axes is parallel with a longitudinal direction of anthracene (pentacene), and the other passes through the linking group ($Y_1$ and $Y_2$).

Anthracene and pentacene have carbons disposed on the same plane. The linking groups $Y_1$ and $Y_2$ are connected with the middle benzene ring of anthracene or pentacene and disposed symmetrically to each other. In this structure, the first optical axis and the second optical axis are perpendicular to each other.

The liquid crystal molecules described above may display various combinations of optical properties, dielectric properties, rotational viscosity, and response speed.

Hereinafter, an LCD device that uses the foregoing liquid crystal composition will be described.

Figure 3:
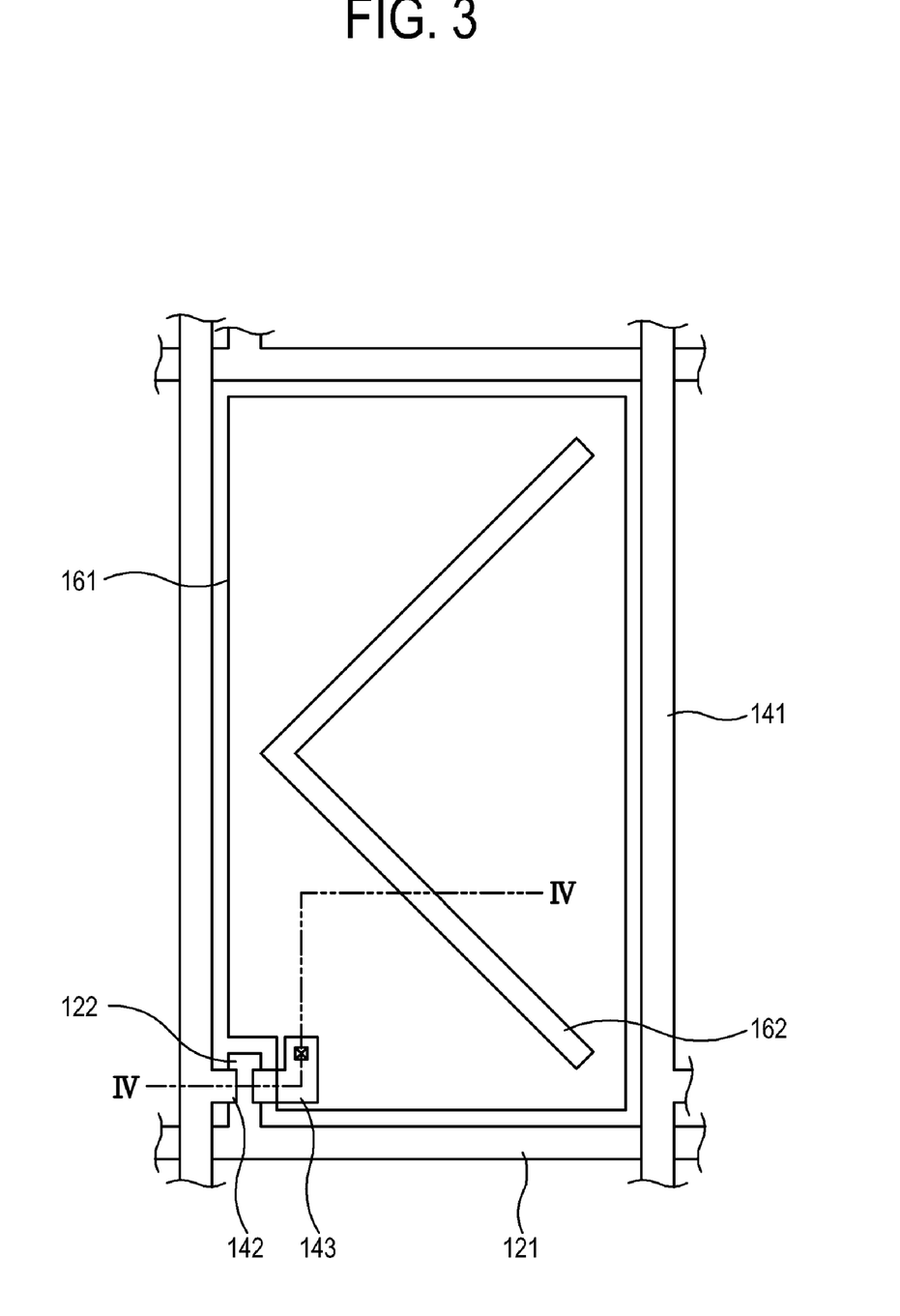
FIG. 3 is an arrangement view of a first substrate in an LCD device according to a second exemplary embodiment of the present invention.
Figure 4:
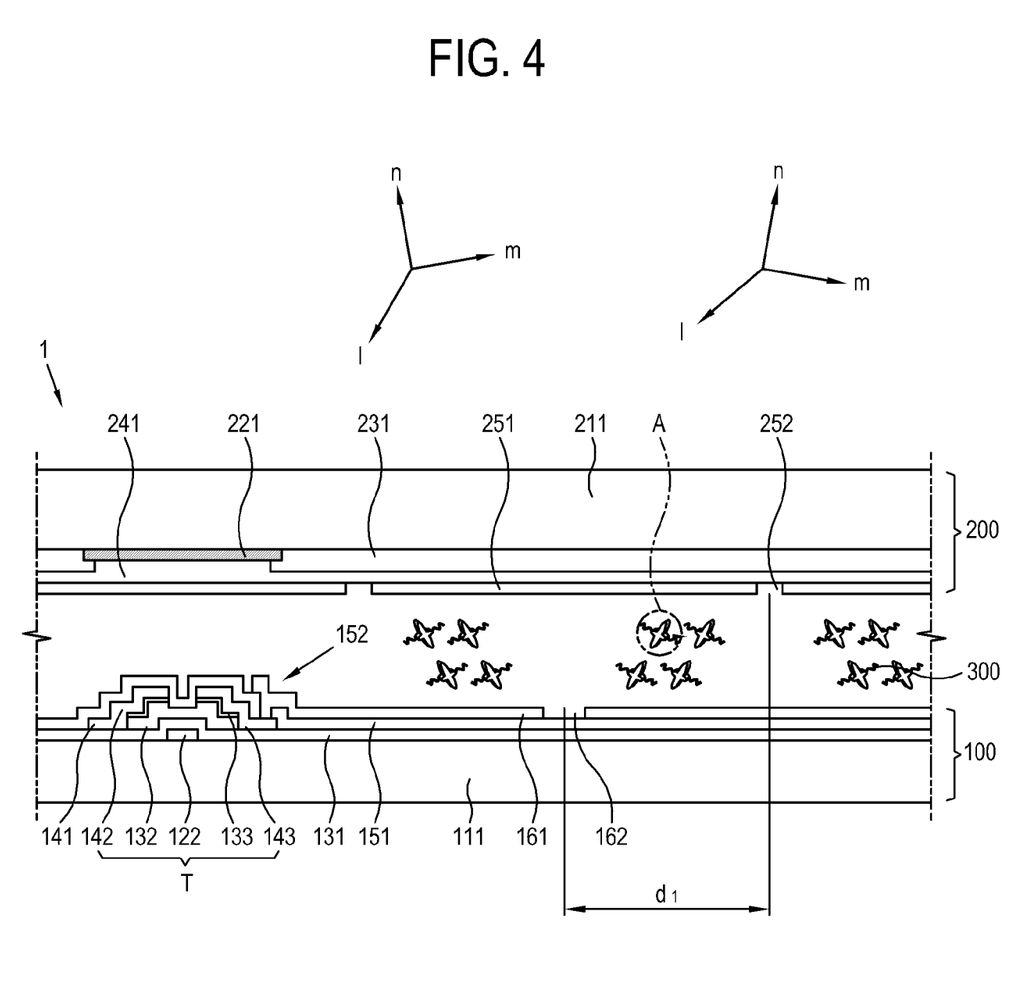
FIG. 4 is a cross-sectional view of the LCD device taken along line IV-IV in FIG. 3.

An LCD device according to a second exemplary embodiment will be explained with reference to FIGS. 3 and 4.

An LCD device 1 includes a first substrate 100 where thin film transistors T are formed, a second substrate 200 facing the first substrate 100, and a liquid crystal layer 300 disposed between the substrates 100 and 200.

With reference now to the first substrate 100, a gate wiring 121 and 122 is formed on a first insulating substrate 111. The gate wiring 121 and 122 may be a metal single layer or a metal multilayer. The gate wiring 121 and 122 is disposed in a display region and includes a gate line 121 extending transversely and a gate electrode 122 connected to the gate line 121.

A gate insulating layer 131 comprising silicon nitride (SiNx) or the like is formed on the first insulating substrate 111 to cover the gate wiring 121 and 122.

A semiconductor layer 132 comprising amorphous silicon is formed on the gate insulating layer 131 over the gate electrode 122. An ohmic contact layer 133 made of n+ hydrogenated amorphous silicon highly doped with n-type impurities is formed on the semiconductor layer 132. The ohmic contact layer 133 is disposed in a channel area between a source electrode 142 and a drain electrode 143.

A data wiring 141, 142 and 143 is formed on the ohmic contact layer 133 and the gate insulating layer 131. The data wiring 141, 142 and 143 may be a metal single layer or a metal multilayer. The data wiring 141, 142 and 143 includes a data line 141 formed lengthwise to intersect the gate line 121 to form a pixel, a source electrode 142 branched from the data line 141 to extend over the ohmic contact layer 133, a drain electrode 143 separated from the source electrode 142 and formed on a portion of the ohmic contact layer 133 opposite to the source electrode 142.

A passivation layer 151 is formed on the data wiring 141, 142 and 143 and on a portion of the semiconductor layer 132 not covered with the data wiring. The passivation layer 151 is formed with a contact hole 152 to expose the drain electrode 143.

A first electrode (pixel electrode) 161 is formed on the passivation layer 151. The first electrode 161 generally comprises a transparent conductive material such as indium tin oxide (ITO) or indium zinc oxide (IZO). The first electrode 161 is connected to the drain electrode 143 through a contact hole 152. The first electrode 161 is formed with a first electrode cutting pattern 162.

The first electrode cutting pattern 162 of the first electrode 161 divides the liquid crystal layer 300 into a plurality of domains along with a second electrode cutting pattern 252 mentioned later.

Next, the second substrate 200 will be described.

A black matrix 221 is formed on a second insulating substrate 211. The black matrix 221 is disposed between red, green and blue filters to divide the filters and prevents light from being irradiated directly to the thin film transistors T on the first substrate 100. The black matrix 221 generally comprises a photoresist organic material that comprises a black pigment. The black pigment may be carbon black, carbon nanotubes, synthetic graphite or the like, or a combination comprising at least one of the foregoing black pigments.

A color filter layer 231 includes red, green and blue filters that are alternately disposed and separated by the black matrix 221. The color filter layer 231 endows colors to light irradiated from a backlight unit (not shown) and passing through the liquid crystal layer 300. The color filter layer 231 generally comprises a photoresist organic material.

An overcoat layer 241 is formed on the color filter layer 231 and the black matrix 231. The overcoat layer 241 provides a planar surface and protects the color filter layer 231. The overcoat layer 241 generally comprises a photoresist acrylic resin.

A second electrode (common electrode) 251 is formed on the overcoat layer 241. The second electrode 251 comprises a transparent conductive material such as ITO or IZO. The second electrode 251 forms a vertical electric field along with the first electrode 161 of the first substrate 100 to drive the liquid crystal layer 300.

A second electrode cutting pattern 252 is formed on the second electrode 251. The second electrode cutting pattern 252 serves to divide the liquid crystal layer 300 into a plurality of domains along with the first electrode cutting pattern 162 of the first electrode 161.

The first and second electrode cutting patterns 162 and 252 may have various shapes. The first electrode 161 may be divided into a plurality of separate domains so that the respective domains may be controlled with different electric signals.

The liquid crystal layer 300 is interposed between the first substrate 100 and the second substrate 200. The liquid crystal layer 300 comprises the biaxial liquid crystal molecules. The biaxial liquid crystal molecules have the first optical axis aligned perpendicular to the opposing faces of the substrates 100 and 200. As a result of this orientation, the second and third optical axes can rotate when subjected to an electric field.

An alignment film (not shown) is formed on at least one of the first and second substrates 100 and 200, directly contacting the liquid crystal layer 300. Due to the alignment film, the liquid crystal molecules have the first optical axis aligned perpendicular to the opposing faces of the substrates 100 and 200 when an electric field is not applied.

Alternatively, the liquid crystal molecules may have the second optical axis aligned perpendicular to the opposing faces of the substrates 100 and 200 which permits the first and third optical axes to rotate when applied with an electric field.

The cutting patterns 162 and 252 determine a rotating direction of the liquid crystal molecules, thereby preventing a disclination line, which may be formed between domains where the liquid crystal molecules have different rotating directions. The liquid crystal layer 300 is divided into a plurality of domains according to the arrangement of the cutting patterns 162 and 252.

A width of a domain d1 (FIG. 4) is determined by an interval between the cutting patterns 162 and 252. Weak fringe fields or the absence of a fringe field may be found in the middle part (A) of each domain. Thus, liquid crystal molecules of the liquid crystal layer 300 positioned in the middle part of the domain move according to the movements of liquid crystal molecules in a circumferential area, and has low response speed. Here, the circumferential area refers to an area between the middle part (A) and boundary of the domain. If the interval between the cutting pattern 162 and 252 is reduced in order to promote the response speed, the brightness of the LCD device is decreased.

Alternatively, the cutting patterns 162 and 252 may not be formed on the first and second electrodes 161 and 251. In another embodiment, a protrusion may be formed instead of the cutting patterns 162 and 252.

In one embodiment, the liquid crystal layer 300 can have an improved response speed while not changing the width of the domain. Further, the width of the domain may be increased by using the liquid crystal layer of the present invention while maintaining response speed at desirable value, thereby increasing an aperture ratio.

Figure 5:
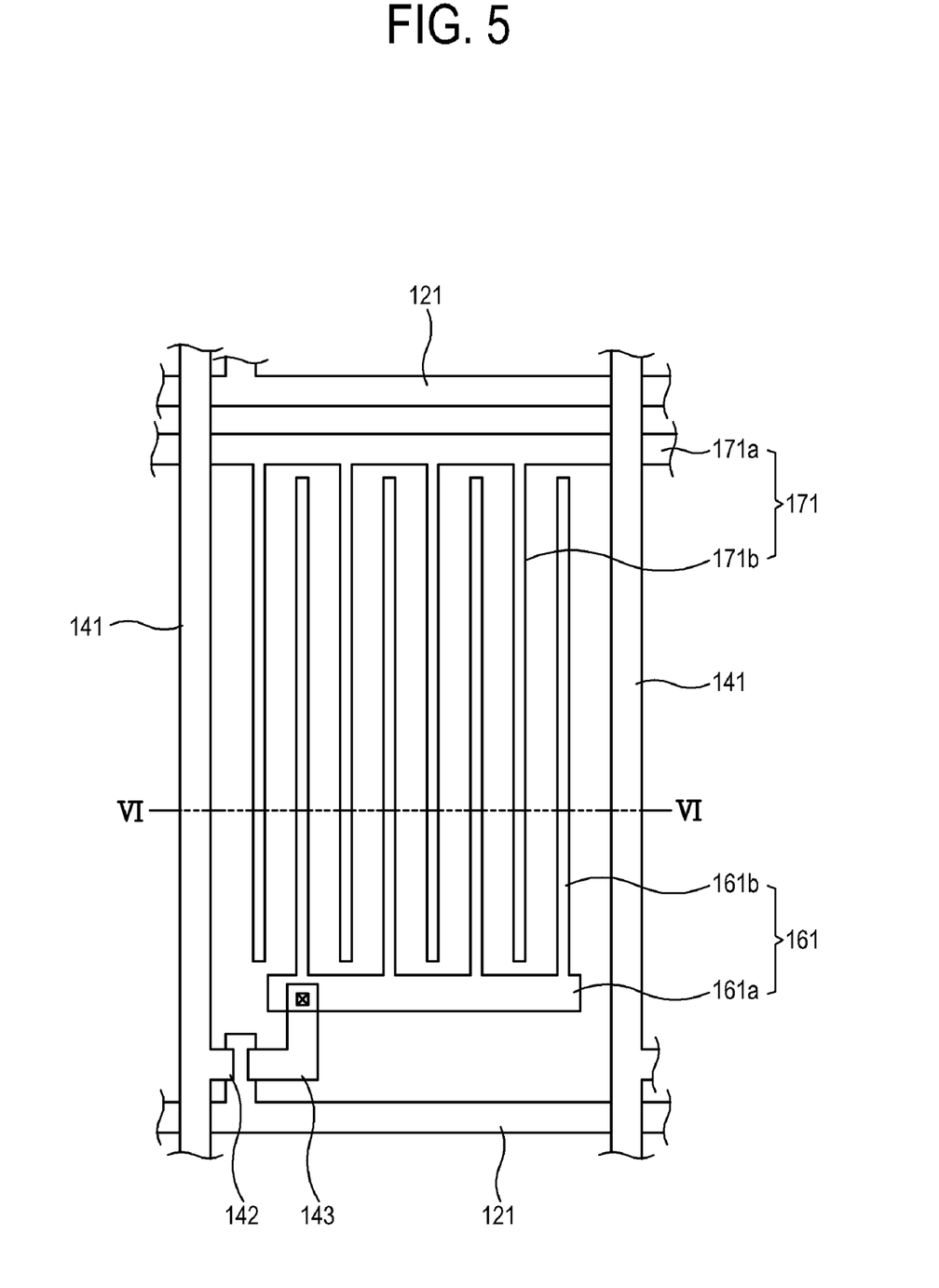
FIG. 5 is an arrangement view of an LCD device according to a third exemplary embodiment of the present invention.
Figure 6:
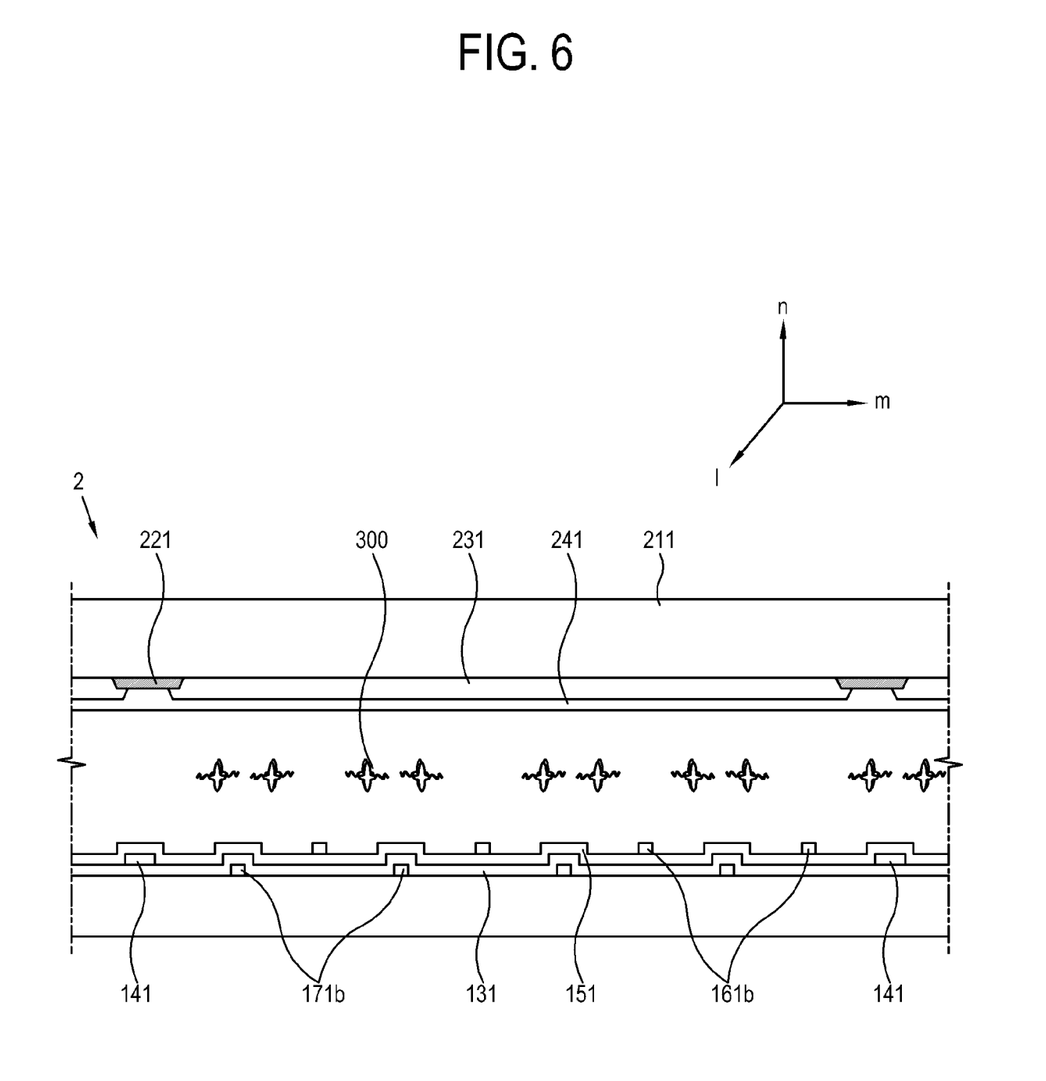
FIG. 6 is a cross-sectional view of the LCD device taken along line VI-VI in FIG. 5.

Hereinafter, an LCD device 2 according to a third exemplary embodiment of the present invention will be described with reference to FIGS. 5 and 6. The description will be made focusing on distinguished features from the second exemplary embodiment.

A first electrode 161 includes a first sub-electrode 161a and a second sub-electrode 161b. The first sub-electrode 161a is parallel with a gate line 121 and connected to a drain electrode 143. The second sub-electrode 161b extends from the first sub-electrode 161a parallel with the data line 141. A plurality of second sub-electrodes 161b are provided and disposed at regular intervals.

Meanwhile, a second electrode 171 is formed in the same layer as the gate line 121. That is, in the third exemplary embodiment, the first and second electrodes 161 and 171 for forming an electric field are all formed on a first substrate 100.

The second electrode 171 includes the third sub-electrode 171a and the fourth sub-electrode 171b. The third sub-electrode 171a is parallel with the gate line 121. A common voltage is applied to the electrodes from the outside. The fourth sub-electrode 171b extends from the third sub-electrode 171a parallel with the data line 141. A plurality of fourth sub-electrodes 171b are provided and disposed at regular intervals.

The second and fourth sub-electrodes 161b and 171b are alternately disposed and parallel with each other. The second sub-electrode 161b is supplied with a pixel voltage and the fourth sub-electrode 171b is supplied with a common voltage to form a horizontal electric field, thereby driving a liquid crystal layer 300.

The liquid crystal layer 300 is disposed between the first substrate 100 and a second substrate 200. The liquid crystal layer 300 includes biaxial liquid crystal molecules. The biaxial liquid crystal molecules have a first optical axis aligned perpendicular to the opposing faces of the substrates 100 and 200 and a second and third axes rotating when applied with an electric field.

An alignment film (not shown) is formed on at least one of the first and second substrates 100 and 200, contacting directly with the liquid crystal layer 300. Due to the alignment film, the liquid crystal molecules have the first optical axis aligned perpendicular to the opposing faces of the substrates 100 and 200 when an electric field is not applied.

Alternatively, the liquid crystal molecules may have the second optical axis aligned perpendicular to the opposing faces of the substrates 100 and 200 and the first and third optical axes rotating when applied with an electric field.

When the second sub-electrode 161b is applied with a pixel voltage and the fourth sub-electrode 171b is applied with a common voltage, a horizontal electric field is formed between the second sub-electrode 161b and the fourth sub-electrode 171b. The second and third optical axes of the liquid crystal molecules rotate according to the electric field to control transmittance of light.

As described above, the present invention provides a liquid crystal composition with an improved response speed and an LCD device having the same.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A liquid crystal composition comprising a liquid crystal molecule expressed as the following chemical formula 1:

Chemical formula 1

Chemical formula 1 where n is 1 or 2, at least one of $X_1$, $X_2$, $X_3$, and $X_4$ comprises one of —F, —Br, —CN, —NO$_2$, and —CF$_3$, $Y_1$ and $Y_2$ are optional and independently represent —OCO—, —COO—, —CF$_2$O—, or —OCF$_2$—, $Z_1$ and $Z_2$ independently represent different aromatic compounds, $T_1$ and $T_2$ independently represent —OR or —R, and R represents an alkyl group.

2. The liquid crystal composition according to claim 1, wherein the aromatic compounds comprise , or

.

3. A liquid crystal composition comprising a liquid crystal molecule expressed as the following chemical formula 1:

Chemical formula 1 where n is 1 or 2, $X_1$ and $X_2$ independently comprise one of —F, —Br, —CN, —$NO_2$ or —$CF_3$, when $X_3$ and $X_4$ each comprise —H, $Y_1$ and $Y_2$ are optional and independently represent —OCO—, —COO—, —$CF_2O$—, or —$OCF_2$—, $Z_1$ and $Z_2$ independently represent different aromatic compounds, $T_1$ and $T_2$ independently represent —OR or —R, and R represents an alkyl group.

4. The liquid crystal composition according to claim 1, wherein the $X_1$, $X_2$, $X_3$, and $X_4$ each comprise the same entity.

5. The liquid crystal composition according to claim 4, wherein R comprises one of $C_4$ to $C_{18}$.

6. The liquid crystal composition according to claim 5, further comprising a monoaxial liquid crystal molecule with negative dielectric anisotropy.

7. A liquid crystal display device, comprising:
a first substrate;
a second substrate facing the first substrate; and
a liquid crystal composition disposed between the first and second substrates,
the liquid crystal composition comprising a liquid crystal molecule expressed by the following Chemical formula 1:

Chemical formula 1 where n is given 1 or 2, at least one of $X_1$, $X_2$, $X_3$, and $X_4$ comprises one of —F, —Br, —CN, —$NO_2$, and —$CF_3$, $Y_1$ and $Y_2$ independently represents one of —OCO—, —COO—, —$CF_2O$—, and —$OCF_2$— or do not exist, $Z_1$ and $Z_2$ independently represent an aromatic compound, $T_1$ and $T_2$ independently represent —OR or —R, and R represents an alkyl group.

8. The liquid crystal display device according to claim 7, wherein the aromatic compound comprises 9. A liquid crystal display device, comprising: a first substrate; a second substrate facing the first substrate; and a liquid crystal composition disposed between the first and second substrates, the liquid crystal composition comprising a liquid crystal molecule expressed by the following Chemical formula 1:

Chemical formula I where n is 1 or 2, $X_1$ and $X_2$ independently comprise one of —F, —Br, —CN, —$NO_2$, and —$CF_3$, when $X_3$ and $X_4$ each comprise —H, $Y_1$ and $Y_2$ independently represents one of —OCO—, —COO—, —$CF_2O$—, and —$OCF_2$ - or do not exist ,$Z_1$ and $Z_2$ independently represent an aromatic compound, $T_1$ and $T_2$ independently represent —OR or —R, and R represents an alkyl group.

10. The liquid crystal composition according to claim 7, wherein $X_1$, $X_2$, $X_3$, and $X_4$ are the same.

11. The liquid crystal display device according to claim 10, wherein R comprises one of $C_4$ to $C_{18}$.

12. The liquid crystal display device according to claim 11, wherein the liquid crystal composition further comprises a monoaxial liquid crystal molecule with negative dielectric anisotropy.

13. The liquid crystal display device according to claim 12, wherein the first substrate comprises a first electrode and a second electrode; the first electrode and the second electrode being used to form an electric field that is applied to the liquid crystal composition.

14. The liquid crystal display device according to claim 13, wherein surfaces of the first electrode and the second electrode face each other in the longitudinal direction.

15. The liquid crystal display device according to claim 13, wherein the first substrate comprises a first electrode formed with a first electrode cutting pattern, and the second substrate comprises a second electrode formed with a second electrode cutting pattern.

* * * * *